May 7, 1946.                H. P. MOYER                2,399,650
              METHOD OF DETERMINING BLADE THICKNESS
                       Filed Aug. 30, 1943
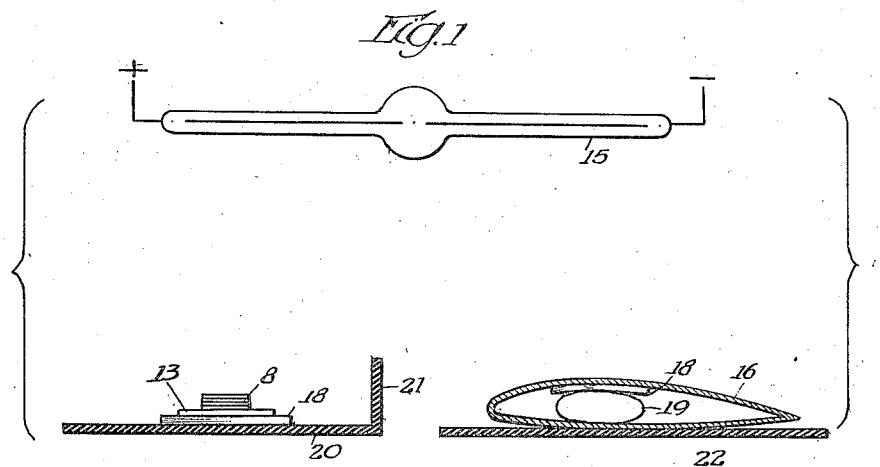
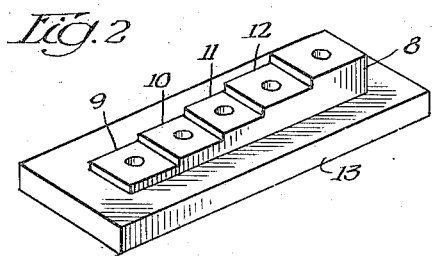
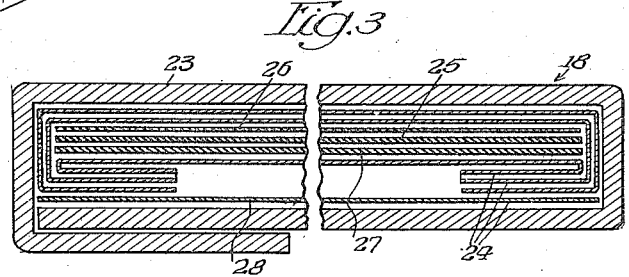
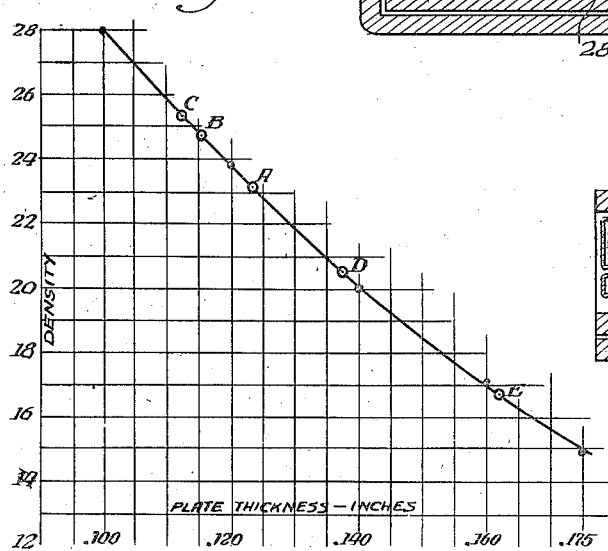
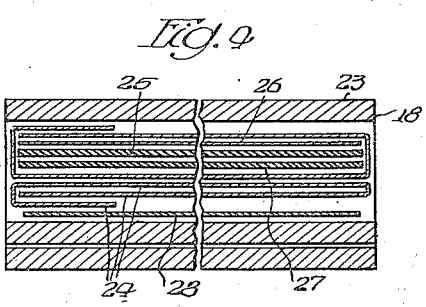
Inventor
Harris P. Moyer
By Thed Gerlach Atty.

Patented May 7, 1946

2,399,650

UNITED STATES PATENT OFFICE 2,399,650

METHOD OF DETERMINING BLADE THICKNESS

Harris P. Moyer, Toledo, Ohio, assignor to The Aviation Corporation, New York, N. Y., a corporation of Delaware Application August 30, 1943, Serial No. 500,500

2 Claims. (Cl. 250—83)

This invention relates in general to an X-ray method of determining plate thickness and is more particularly described in connection with the manufacture of hollow steel propeller blades.

One of the important objects of the invention is to determine the thickness of a plate which is not easily measured by mechanical means, such as a caliper or a micrometer. Further objects of the invention are: to measure plate thickness of particular forms which are not ordinarily accessible for the application of mechanical measuring means without destroying or partially destroying the plate; to demonstrate the thickness and density of a plate by a photographic comparison method; to make accurate photographic film comparisons by using different portions of the same film; to utilize a stepped block for comparison of plate thickness; to develop the film portions simultaneously in pairs to reduce error in film density; to screen the film under exposure with lead sheets to avoid secondary ray effects; to interpolate various plate thicknesses by a film density method; and to check actual thicknesses with those predicted and determined by the densitometer.

Other objects will appear in the specification and will be apparent from the drawing in which Fig. 1 is a somewhat diagrammatic view illustrating a common X-ray source applied to a densitometer block and to a plate whose thickness is to be measured in accordance with this invention;

Fig. 2 is a perspective of a step penetrometer comparison plate as shown in Fig. 1;

Fig. 3 and 4 are broken transverse and longitudinal sections of a film pack, portions of which are used simultaneously in Fig. 1; and Fig. 5 is a diagram of the readings obtained comparing density and plate thickness in inches of a plate being tested.

While this invention is applicable to the measurement of metal thicknesses, it is particularly described as applied in the manufacture of hollow steel propeller blades, as it is of primary importance that the thickness of the metal plate be held to very close tolerances. The strength of the entire blade is dependent upon the strength of a blade cross section composed of a leading and trailing edge and a thrust and camber plate.

In many designs of blades, the thinest section occurs at the center of the thrust and camber plates, and it is therefore a decided advantage to show the thickness of any particular area in question. Heretofore, the only method of determining the plate thickness of 75% of the area of a finished blade was by means of the destructive method of sectioning the blade itself. By the application of the present technique of measurement by X-ray, the entire area of a finished blade can be determined within very close limits without depending upon mechanical measuring devices.

In carrying out this invention, it is known that a given X-ray will penetrate a plate with a certain amount of intensity which is a definite function of the plate thickness. By comparing this with the intensity of X-ray penetration of test plates of known thickness, the results can be applied to similar action with a plate of unknown thickness, with the result that the unknown thickness may then be predicted.

The thickness of the plate being X-rayed will determine the density of the negative thus produced, and this may be compared with the similar and simultaneous exposure of a portion of the same film upon a stepped test plate of known thicknesses.

Under standard conditions, the thicker the plate is, the more of the X-rays will be absorbed in the plate and the less the X-ray negative will be exposed by the rays getting through the material to the negative.

A rectangular piece of metal 8 as shown in Fig. 2 has various steps 9, 10, 11 and 12 of various thicknesses, preferably of the same material or stock of the plate to be measured. This may be mounted upon a base plate 13 of the same material to be measured which constitutes a step penetrometer for the test to be made.

An X-ray tube 15 having a suitable source of current supply is positioned above a test block penetrometer 8 and a plate 16 of which the thickness is to be measured. A film 18 is located at a distance from tube 15 and is cut in two pieces, one being placed under the block 8, and the other underneath the plate 16. In the case of a propeller blade, the film is held against the underside of the portion to be measured by means of a bladder 19 placed below the film and inflated. A lead screen sheet 20 is placed below the film under the test block and has an upturned end 21 which screens it from the plate under test. The plate under test is supported and screened from below by a lead screen sheet 22.

A suitable type of film, represented generally as 18 in Fig. 1 is shown in cross sections in Figs. 3 and 4 and comprises an outer cardboard holder 23 with an inside wrapper 24 of black or opaque paper enclosing an X-ray film 25 having a lead filter screen 26 at one side and a lead back filter 27 at the other side. A lead back screen 28 may also be inserted between the wrapper and the holder to minimize back scatter. The lead filter in front of the film eliminates the effects of secondary rays and provides somewhat of an intensifying effect at proper kilo-voltage. The quality of lead immediately adjacent to the film is very important as any variations in smoothness of the lead can produce a mottling effect on the negative due to localized emission from the high points of the lead. This makes densitometer readings very inaccurate and should be avoided for precision work. A film 25 having high contrast is desirable so that with a given thickness change of the material being X-rayed, a maximum change in density will result.

A fine grained high contrast non-screen film is desirable for best results, and a non-screen type is used because a slight bending of the film in service might be encountered, and the use with an intensifying screen would not be satisfactory. The purpose of the film pack is to hold the lead filter screen and the back filter in their proper relation to their X-ray film and to produce an enclosed light proof sheath so that the film may be handled in daylight without exposure.

After the two sections of the same film, located at the same distance from the X-ray tube are simultaneously exposed, at approximately the same angle to the X-ray tube, it is desirable to simultaneously process the film sections. Ordinary tank or pan development, with normal thermo-variations, were found to produce variations in the density of the film which would cause an appreciable error in the predicated plate thickness. A circulation developer system in the development tank proved satisfactory and easy to handle.

The simultaneously exposed films are hung in pairs and processed through the development, fixing and washing tanks. Before drying, the films are rinsed in a solution containing a wetting agent in order to eliminate any water spotting which interferes with the densitometer reading.

With the aid of the densitometer, the densities of the various thicknesses of the known or test blocks were then determined. A density-thickness curve such as shown in Fig. 5 is then plotted showing the values at various stations as noted on the curve.

After determining the density of the unknown plate, or in this particular case, the wall 16 of the propeller blade, the corresponding thickness is predictable by the use of the density thickness curve, established from the known blocks. Where the thicknesses to be measured are known to be thin narrow ranges, the step penetrometers of .010 of an inch steps may be used, placed in the proper location adjacent to the blades. The density of the blade film is then determined after processing the pairs of films. The densities of the corresponding step penetrometer film is then determined and two steps are noted, one of which is denser, and the other of which is less dense than the blade film. The density of the blade film which is to be measured is found to be within the range of the densities of two known thicknesses of the step penetrometer. A mathematical calculation similar to the proportional part determination between two main logarithm values indicates how much in thousandths should be added to the thin step or subtracted from the heavy step of the step penetrometer to determine the blade or plate thickness to be desired.

An example of the step penetrometer thickness and density may be as follows:

| Known penetrometer thickness | Density |
|---|---|
| 0.100 | 2.79 |
| 0.120 | 2.39 |
| 0.140 | 2.02 |
| 0.160 | 1.74 |
| 0.175 | 1.48 |

In a typical example for predicating the thickness of a plate being tested in accordance with the above method, as recorded below, readings were made at stations A, B, C, D and E (column 1).

| Sta. | Density | Predicated thickness | Actual thickness |
|---|---|---|---|
| A | 2.32 | 0.124 | 0.127 |
| B | 2.48 | .115 | .116 |
| C | 2.54 | .112 | .116 |
| D | 2.06 | .138 | .142 |
| E | 1.68 | .162 | .165 |

After determining the density of the films at these stations by means of a densitometer these densities (column 2) are located upon the density thickness curve, Fig. 5, from which the plate thickness may be determined or the intermediate densities may be interpolated between the thickness of the step plate as given above, the result of which gives the predicated thicknesses as contained in column 3.

After the above test, the blade was sectioned and actual measurements were made which are contained in the fourth column, and by comparison it will be noted that the accuracy of predictions were within .004 of an inch in this particular instance.

Although this process has been particularly described with reference to propeller blades, the same procedure is applicable to any problem in the measurement of metal thicknesses. It is necessary to use care to produce accurate results, as a slight variation in emulsion thickness on the film or careless developing of the film produces considerable error. The use of direct reading densitometers for determining film thickness also serve to eliminate human errors. With adequate control and equipment remarkable accuracies are obtainable.

I claim:

1. The method of determining ordinarily inaccessible propeller blade thickness of a hollow blade, which comprises inserting an X-ray film inside of the blade and holding it against the inner side of the plate to be tested, applying a portion of the same film to the underside of a stepped test block, outside of the blade, simultaneously exposing both portions of the film to the same X-rays under similar conditions, developing the films and obtaining the film densities for the various areas by densitometers, and comparing the density of the plate area in question with the densities of the steps of the test block above and below the density of the plate area to be tested, and determining therefrom the proportionate difference between the steps and the thickness corresponding thereto as assigned to the plate area.

2. The method of determining the thickness of the wall of a hollow propeller blade which is ordinarily inaccessible to mechanical thickness measuring instruments, which comprises, inserting a portion of an X-ray film within the blade and holding it against the underside of the area to be tested, applying a portion of the same film to the underside of a stepped test block outside of the blade, screening the film under the test block from the plate to be tested, simultaneously exposing both portions of the film to the same X-rays under similar conditions, developing films and obtaining film densities for the various areas by densitometers, comparing the density of the plate area in question with the density of the steps of the test block above and below with the density of the plate area to be tested, and determining therefrom the proportionate difference between the steps and the thickness corresponding thereto, as assigned to the plate area.

HARRIS P. MOYER.